No. 651,620. Patented June 12, 1900.
C. S. WRIGHT.
END GATE.
(Application filed Jan. 25, 1900.)
(No Model.)
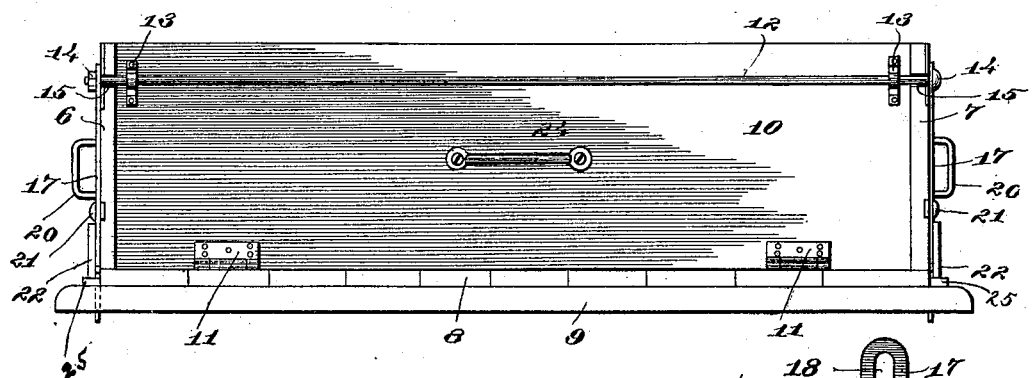
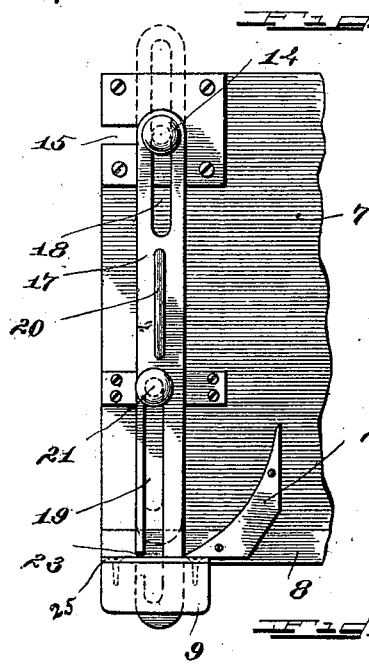
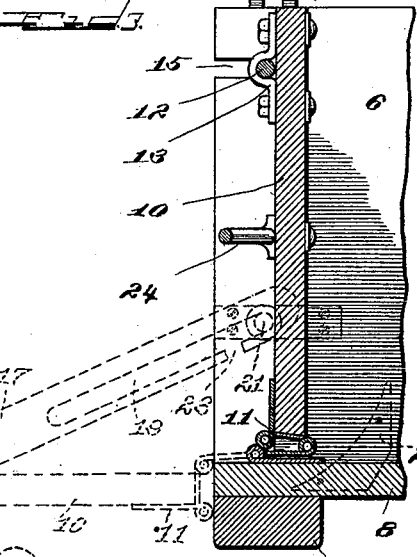
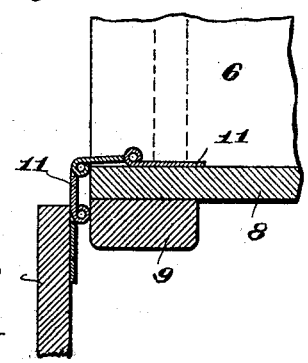
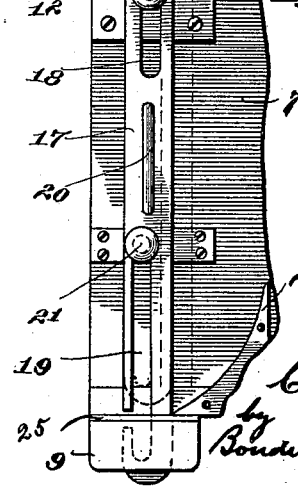
Witnesses
Inventor
Charles S. Wright,
Attys

UNITED STATES PATENT OFFICE.

CHARLES S. WRIGHT, OF KANSAS CITY, KANSAS.

END-GATE.

SPECIFICATION forming part of Letters Patent No. 651,620, dated June 12, 1900.

Application filed January 25, 1900. Serial No. 2,734. (No model.)

*To all whom it may concern:*

Be it known that I, CHARLES S. WRIGHT, a citizen of the United States, residing at Kansas City, in the county of Wyandotte and State of Kansas, have invented certain new and useful Improvements in End-Gates, of which the following is a specification, reference being had to the accompanying drawings.

My invention relates to end-gates for wagons and other similar vehicles, and has for one object to provide an end-gate which can be quickly and easily operated without detaching it from the wagon and which can also be made to hang straight down out of the way when desired to permit backing the wagon up close to a platform or other object.

A further object is to provide an end-gate so constructed that when used with a wagon-bed having extension side and end boards the end-gate or lower end-board may be opened without removing the upper end-board.

My invention also provides certain other improvements, which will be hereinafter pointed out.

In the accompanying drawings, Figure 1 is a view of one side of the end-gate, showing it in place on a wagon-box. Fig. 2 is an enlarged view showing the rear end of one of the sides of the wagon-box and the devices for operating the end-gate. Fig. 3 is a longitudinal vertical sectional view of the rear end of the wagon-box and end-gate, illustrating in dotted lines one of the positions to which the end-gate may be adjusted. Fig. 4 is an enlarged detail illustrating one of the hinges of the end-gate and the arrangement of the end-gate and the wagon-box, and Fig. 5 is an enlarged detail showing a modification.

Referring to the drawings, 6 7 indicate the side-boards, and 8 the bottom, of a wagon-box.

9 indicates a cross-timber, arranged under the bottom 8.

10 indicates the end-gate, which extends across the rear end of the wagon-box between the side-boards 6 7, resting on the bottom 8. The end-gate 10 is connected with the bottom 8 by hinges 11, which are provided with four leaves, as shown in Figs. 3 and 4, the end leaves being secured to the end-gate and bottom 8, respectively, as shown in Fig. 4. The arrangement is such that when the end-gate 10 is turned up to a vertical position between the side-boards 6 7, as shown in Fig. 3, the intermediate leaves of the hinges 11 are folded over upon the leaf secured to the bottom 8. When the end-gate is turned to a horizontal position, as shown in dotted lines in Fig. 3, one of the intermediate leaves is in a horizontal and the other in a vertical position, the latter being parallel with the rear vertical edge of the bottom 8, as shown. When the end-gate 10 is dropped and permitted to hang from the rear end of the wagon-box, as shown in Fig. 4, the two outer leaves are in a vertical position and the two inner leaves in a horizontal position, as shown. It will be understood that the number of hinges used will depend upon the circumstances of the case, one or more being provided, as may appear necesssary or advisable. It will be observed that one of the end leaves of the hinge is secured to the said bottom and the other to the end-gate with the end of said end-gate resting against one of the intermediate leaves of the hinge when the end-gate is in its vertical position across the end of the wagon-box. This arrangement serves to guide the end-gate into proper position when closed. It will be seen that when the gate is swung back to closed position it should stand perpendicular to the bottom of the body, and since it is connected to one of the outer leaves of the hinge and rests at its bottom against the adjacent leaf of the hinge the latter serves to guide it to its proper position.

12 indicates a rod which is secured to the end-gate 10 near its upper edge, preferably by clips 13. Heads 14 are provided at the ends of the rod 12, which extend a short distance beyond the side-boards 6 7, as shown in Fig. 1. The latter are provided with slots 15, large enough to permit the passage of the rod 12, as shown in Figs. 2 and 3, this construction being provided in order to permit the end-gate to be secured at a point a short distance from the rear ends of the side-boards. In Figs. 1, 2, and 3 I have shown the slots 15 arranged horizontally, and this is the construction I prefer to use; but for certain purposes they may be arranged vertically, as shown at 16 in Fig. 5.

17 indicates vertically-movable locking-bars, one of which is arranged at each side of the wagon-box, as shown in Fig. 1. Each of said locking-bars is provided with an upper longitudinal slot 18 and a lower longitudinal slot 19 and with a handle 20, arranged between said slots, as shown in Fig. 2. The locking-bars 17 are fitted against the side-boards 6 7 near their rear ends, the ends of the rod 12 passing through the upper slots 18, the heads 14 of said rod operating to prevent the disconnection of said locking-bars with said rod. Said locking-bars are further held in position by bolts 21, which are secured to the side-boards 6 7 and project through the lower slots 19, said bolts 21 having suitable heads to prevent their accidental disengagement with said locking-bars. As shown in Figs. 2 and 3, the bolts 21 are placed a short distance below the vertical center of the end-gate 10; but their location may be varied, if desired. By this construction it will be noted that the locking-bars may be moved longitudinally, the slots 18 19 permitting such movement. The arrangement of such slots with relation to the rod 12 and bolts 21 is such that when the locking-bars are in their vertical position (shown in Fig. 2) the ends of the rod 12 and the bolts 21 are at the upper ends of the slots 18 19 and support said locking-bars, and the length of the locking-bars is such that when in the position shown in Fig. 2 the lower ends of said bars project down into and preferably through the cross-beam 9, as shown, suitable slots being provided in the cross-beam for that purpose. This arrangement locks the locking-bar against a lateral or swinging movement, inasmuch as the bolts 21 and the slots in the beam 9 act at two points on the locking-bar to prevent such swinging movement. This consequently locks the end-gate through its connection with the locking-bars by means of the rod 12. Metal plates 25 are provided on the beam 9, as shown in Figs. 1, 2, and 5, through which the locking-bars pass for taking the wear of the locking-bars. By raising the locking-bars high enough to carry their lower ends out of the slots in the beam 9, however, said locking-bars are released and may turn upon the bolts 21 as pivots to carry the ends of the rod 12 out of the slots 15, and thereby carry the upper end of the end-gate back, permitting it to be turned down to a horizontal position. To return the end-gate to its vertical position in the wagon-box, it is simply necessary to raise it, moving the ends of the rod 12 into the slots 15, when the locking-bars automatically drop to the position shown in Fig. 2 and lock the end-gate in position. For the purpose of guiding the locking-bars, so as to carry the ends of the rod 12 properly into the slots 15 automatically, concave guides are provided, consisting of suitably-shaped blocks secured to the sides of the wagon-box, as shown in Fig. 2. The lower ends of the locking-bars 17, which are rounded, bear against the concave faces of the guides 22 as the end-gate is being raised, holding the upper portion thereof high enough to carry the ends of the rod 12 into said slots 15. Said guides also guide the lower ends of the locking-bars 17 into the slots in the beam 9.

In order to permit the end-gate to hang vertically from the end of the wagon-box, it is necessary to disconnect the locking-bars 17 with the bolts 21, and for this purpose openings 23 are provided from the slots 19, as shown in dotted lines in Fig. 3. When it is desired to disconnect the locking-bars 17 with the bolts 21, said locking-bars are moved so as to carry the openings 23 opposite the bolts 21, when the bars may be detached from said bolts and permitted to drop, the end-gate being then also permitted to drop to the position shown in Fig. 4. Where there is no objection to lifting the end-gate slightly in order to permit its being opened, the construction shown in Fig. 5 may be used, as such construction requires the lifting of the end-gate high enough to carry the ends of the rod 12 out of the vertical slot 16. The construction shown in the remaining figures, however, does not require the lifting of the end-gate, as its upper end may be turned directly back, owing to the horizontal arrangement of the slots 15.

24 indicates a handle secured to the end-gate for use in opening and shutting it.

That which I claim as my invention, and desire to secure by Letters Patent, is—

1. The combination of a wagon-box, an end-gate therefor, and a hinge connecting the lower edge of the end-gate with the bottom of the box, said hinge comprising four leaves, one of the end leaves being secured to the bottom of the wagon-box and the other end leaf to the end-gate, the lower end of said end-gate adapted, when the end-gate is in its vertical position across the end of the wagon-box, to rest against the adjacent intermediate leaf, whereby the hinge serves to guide the gate to its proper perpendicular position with respect to the bottom or bed of the wagon-box when closed, substantially as described.

2. The combination of a box, an end-gate therefor, one or more hinges connecting the lower edge of the end-gate with the bottom of the box, said hinges being composed of four leaves, the end leaves being secured respectively to the end-gate and to the bottom of the box, and means for locking said end-gate in operative position across the end of the box, substantially as described.

3. The combination of a box, an end-gate therefor, a longitudinally-movable locking-bar at one end of said end-gate, said locking-bar being connected with said end-gate and being pivotally mounted on said box, and means for automatically engaging one end of said bar when the end-gate is raised into position to close the end of the box, to prevent the turning of said locking-bar on its pivot when the end-gate is in such position, substantially as described.

4. The combination of a box, an end-gate therefor, a locking-bar at one end of said gate, said locking-bar being connected with said end-gate and being pivotally mounted on said box, and means for automatically engaging one end of said bar when the end-gate is raised into position to close the end of the box, to prevent the turning of said locking-bar on its pivot when the end-gate is in such position, substantially as described.

5. The combination of a box, an end-gate, one or more hinges connecting the lower edge portion of the end-gate with the bottom of the box and arranged to permit the end-gate to be turned to a horizontal position beyond the rear end of the box, and bars connecting the upper end portions of the end-gate with the box for supporting said end-gate, in its horizontal position, said bars being detachably arranged to permit the end-gate to hang in a substantially-vertical position from the box, substantially as described.

6. The combination of a box, an end-gate therefor, a locking-bar for said end-gate, said locking-bar having a slotted connection with the upper end of said end-gate and with the side of the box whereby it may be moved longitudinally, and means for engaging one end of said bar for locking the end-gate in position across the end of the box, substantially as described.

7. The combination of a box, an end-gate therefor, a locking-bar for said end-gate, said bar having a slotted connection with the upper end of said end-gate and with the side of the box whereby it may be moved longitudinally, the lower end of said bar being adapted to engage a fixed portion of the box when said bar is in its lowermost position for locking the end-gate in position across the end of the box, substantially as described.

8. The combination of a box, an end-gate therefor, a slotted locking-bar for said end-gate, said locking-bar having an adjustable connection with said end-gate, a pin projecting from said box and adapted to enter the slot in said locking-bar, and a passage communicating with said slot for detaching said locking-bar from said pin, substantially as described.

9. The combination of a box, an end-gate therefor, said end-gate having a rod extending longitudinally thereof near its upper edge, locking-bars at the ends of said end-gate said locking-bars having slots adapted to receive the ends of said rod, pins projecting from the sides of the box and entering the slots in said locking-bars, and recesses in said box adapted to receive the lower ends of said locking-bars when the end-gate is in its vertical position across the end of the box, substantially as described.

10. The combination of a box, an end-gate therefor, a locking-bar for said end-gate, said locking-bar having a slotted connection with the upper end of said end-gate and with the side of the box whereby it may be moved longitudinally, means for engaging one end of said bar for locking the end-gate in position across the end of the box, and a concave guide for the lower end of said locking-bar, substantially as described.

CHARLES S. WRIGHT.

Witnesses:
   FRED. H. TURNER,
   J. B. CHURCHILL.